June 20, 1961 P. J. MAZZIOTTI 2,988,904
DOUBLE UNIVERSAL JOINTS
Filed Sept. 25, 1959 2 Sheets-Sheet 1

INVENTOR.
PHILIP J. MAZZIOTTI
BY *Walter E. Pavlick*

ATTORNEY

INVENTOR.
PHILIP J. MAZZIOTTI
BY Walter E. Pavlick

ATTORNEY

United States Patent Office 2,988,904
Patented June 20, 1961

2,988,904
DOUBLE UNIVERSAL JOINTS
Philip J. Mazziotti, Toledo, Ohio, assignor to Dana Corporation, Toledo, Ohio, a corporation of Virginia
Filed Sept. 25, 1959, Ser. No. 842,433
5 Claims. (Cl. 64—21)

This invention relates to universal joint structures and more particularly to an improved form of double universal joint.

Limitations have been imposed upon the use of single universal joint structures due to the non-uniform motion produced by such joints. Double universal joints have been employed to suit operating conditions beyond the capabilities of the simpler single universal joint. These double universal joints remedy the non-uniform motion conditions prevalent with the single universal joint and thus may be termed constant velocity joints.

However, the centering assembly or positioning means required in the double universal joint has presented additional problems. The surfaces of the centering assembly must slide at high speeds and rotate simultaneously. The rotary motion in combination with the oscillating forces present during the operation of the universal joint produce stick-slip conditions which hinder the operation of the centering device. Objectionable noises or rattles also result from excessive clearances or restraints on the sliding surfaces.

It is also important that the sliding or bearing surfaces of the centering assembly be kept well lubricated and sealed against entry of grit and dirt. A particularly effective sealing means is required to prevent throw-off caused by centrifugal force. Prior centering assemblies have been completely housed in metal casings or boots of leather or rubberized material which contain the required lubricant. However, these devices have been either ineffective or difficult to manufacture and thus expensive.

An object of this invention is to provide uniform movement between the sliding or bearing surfaces of the centering or positioning assembly of a double universal joint, thereby eliminating stick-slip conditions.

Another object of this invention is to provide a sealing means which is adapted to perform the above function.

A further object of this invention is to reduce noise and rattles caused by excessive clearances or restraints in the centering assembly of a double universal joint structure.

A still further object of this invention is to provide a centering assembly for a double universal joint structure having an inexpensive and effective sealing means.

In the preferred embodiment of this invention a pair of connected universal joints are provided with centering means. The centering means comprises cooperating members, one having a socket and the other having a stem extending into the socket, a ball-shaped member is rotatable and slidable on the stem and resilient means associated with the stem is provided to bias the ball-shaped member into constant engagement with the socket.

Other objects and advantages of this invention will become apparent from the following detailed description taken in connection with the accompanying drawings wherein.

Figure 1:
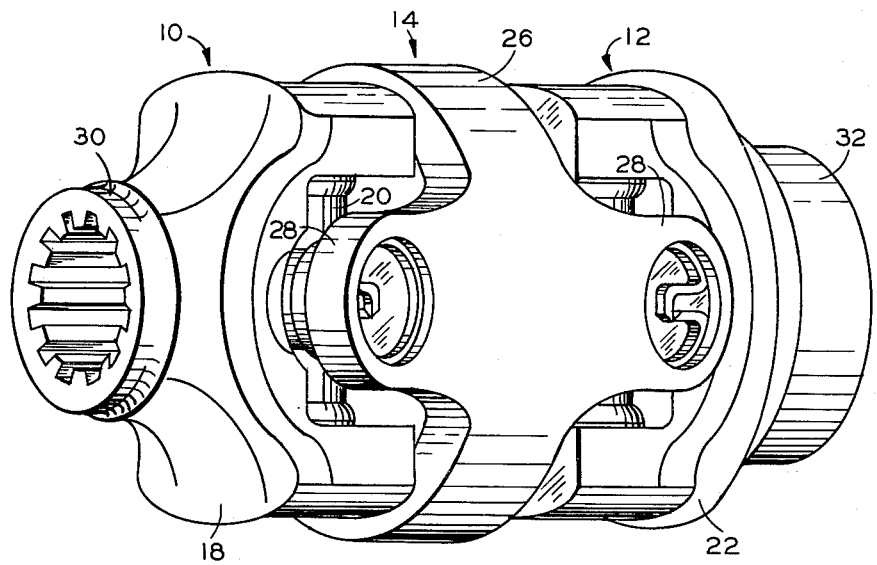
FIG. 1 is a perspective view of the double universal joint embodying this invention.
Figure 2:
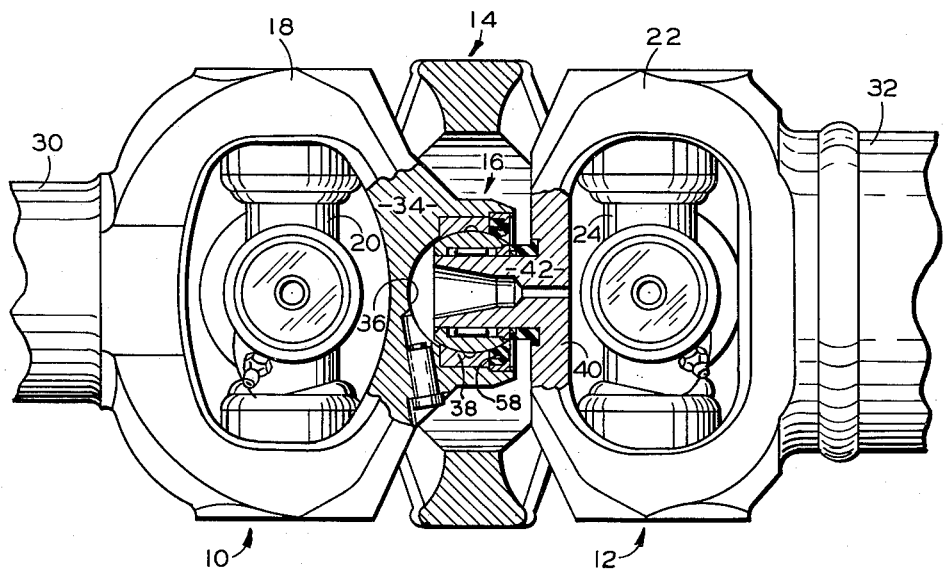
FIG. 2 is an elevation view showing the joint structure of FIG. 1 with parts thereof in section.

Referring more particularly to the drawings, a pair of universal joint assemblies 10 and 12 are operably connected by an intermediate motion or torque transmitting member 14, and a centering assembly 16 for relatively positioning corresponding members of the assemblies with respect to each other. The centering assembly 16 cooperates with corresponding members of the two joint assemblies and causes these members to always assume the same angular position relative to an oscillation center of the centering assembly when a flexing of the universal joint structure takes place.

The universal joint assembly 10 comprises a yoke 18 and a cross 20. The universal joint assembly 12 comprises similar yoke and cross members 22 and 24. Each of these yokes 18 and 22 has spaced arms carrying suitable bearings which receive oppositely extending trunnions of the crosses 20 and 24 respectively.

The intermediate motion transmitting member 14 takes the form of an annulus 26 having pairs of ears 28 extending in opposite directions axially of the structure and spaced 180° apart on the annulus. Suitable bearings are provided in the ears 28 for receiving a second pair of oppositely extending trunnions of each cross 20 and 24. The second pair of oppositely extending trunnions is disposed at right angles to the axis of the trunnions received in the yokes 18 and 22. From the arrangement which is illustrated in the drawings and which has just been described, it is apparent that the intermediate motion transmitting member 14 is a double yoke member common to and connecting the joint assemblies 10 and 12. Moreover, from the foregoing it is understood that the crosses 20 and 24 are trunnioned or swivelled in the yokes 18 and 22 and connect the same with the intermediate motion transmitting member 14.

The yoke 18 of the joint assembly 10 is provided with a splined sleeve extension 30 for connection with a power shaft such as a shaft of a motor vehicle transmission. The yoke 22 of joint assembly 12 may also be provided with a sleeve extension 32 for connection with a power shaft, such as a propeller shaft or axle shaft of a motor vehicle. The unitary yoke and splined sleeve construction for connecting the joint assemblies to respective power shafts is merely illustrative. Other constructions, such as a two piece yoke having bolted connecting means, may also be used.

Figure 3:
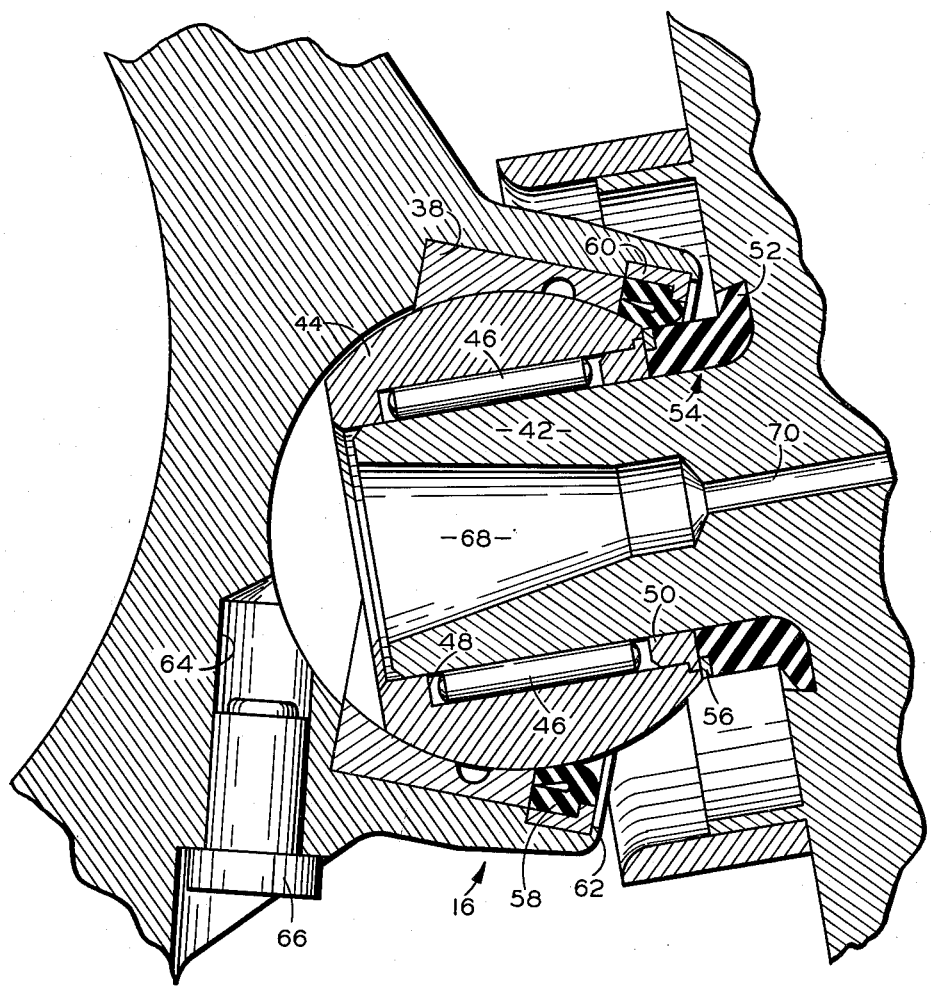
FIG. 3 is an enlarged sectional view of the centering assembly illustrated in FIG. 2.

To provide the joint assemblies 10 and 12 with the centering assembly or positioning means 16, a bridge extension or web 34 integrally connects the arms of yoke 18. As best shown in FIG. 3 the medial portion of the web 34 is enlarged and provided with a lubricant reservoir which takes the form of a substantially spherical-shaped recess 36 having an opening at one end thereof. An annular insert or socket member 38 is fitted into the wall of reservoir 36 adjacent the open end and protrudes slightly into the reservoir.

Another bridge extension or web 40 integrally connects the arms of yoke 22. The medial portion of web 40 has a cylindrical stem 42 extending outwardly therefrom and into the socket opening of the reservoir 36. A spherical ball element 44 having the ends thereof truncated is rotatable and axially slidable on the cylindrical stem 42. Interposed between the ball element 44 and the stem 42 are a plurality of needle bearings 46 which facilitate relative movement of the ball and stem. The ball element 44 is counter bored to accommodate the bearings 46 and an annular shoulder 48 is formed thereby to limit axial movement of the bearings in one direction. An annular plug 50 is disposed about stem 42 and is snugly positioned in the end of ball member 44 opposite shoulder 48 to limit axial movement of the bearings in that direction. While the use of needle bearings has been illustrated and described in the present embodiment, it will be apparent to those skilled in the art that other types of bearings may be employed or the use thereof entirely omitted.

The webs 34 and 40 on the joint structures, in addition to carrying the centering assembly, materially strengthen the yokes. The ball member 44 of the center assembly has the outer surface thereof shaped to correspond to the inner surface of socket insert 38. Means is provided to constantly bias the ball member 44 into engagement with socket 38 while also sealing external leakage between the ball member 44 and stem 42. To this end, the web 40 is counter bored adjacent the base of stem 42 and fixedly receives an outwardly extending flange 52 of an annular resilient member 54 disposed on stem 42. The resilient member 54 extends outwardly on stem 52 and engages plug 50 in the ball member 44 to urge the ball member into engagement with the socket 38. A retaining ring 56 is disposed between the outer portion of resilient member 54 and the ball member 44 to prevent spreading of the resilient member to the outer surface of the ball member.

Means is also provided to seal external leakage and prevent entry of foreign matter between the ball member 44 and the socket 38. More particularly, an annular resilient member 58 having a substantially U-shaped cross section is secured about the socket opening in reservoir 36 by a cup 60 which is, in turn, held in place by a bent-over lip 62 on web 34. The resilient member 58 has portions thereof sealingly engaging the end of socket insert 38 and the outer surface of ball member 44.

For supplying lubricant to the sliding or bearing parts of the centering assembly 16, a lubricant supply passage 64 is provided in the web 34. An externally accessible supply fitting 66 is disposed in one end of passage 64 and the other end of passage 64 communicates with reservoir 36. To facilitate lubrication of the centering assembly 16 a tapered relief passage 68 is provided in stem 42. This passage communicates with the lubricant reservoir 36 at the outer end of stem 42 and with a duct 70 in web 40 of yoke 22 at the base of stem 42. Duct 70 extends completely through web 40 and communicates with the atmosphere. The relief passage 68 and duct 70 permit the escape of air from the reservoir 36 as lubricant is forced thereinto, and further the appearance of lubricant at the outer end of duct 70 will indicate to the operator that the centering assembly 16 has received sufficient lubricant.

From the foregoing it is apparent that lubricant is supplied to all the sliding or bearing parts and sealed from external leakage. The sealing means 54, 58 is less expensive than prior devices since less material is required when the sealing means engages the bearing surfaces themselves rather than immersing the entire structure in a sealing lubricant casing.

Furthermore, the seal member 54 by constantly biasing the ball member 44 into engagement with socket 38 preloads these bearing surfaces and ensures uniform movement therebetween. Thus the objectionable stick-slip condition and noise resulting from a floating bearing member is eliminated.

While only a single embodiment of this invention has been shown and described it is apparent that there may be many changes in structure and operation without departing from the scope of this invention as defined by the appended claims.

I claim:

1. A universal joint assembly comprising a pair of connected universal joints, centering means for said joints comprising cooperating members one having a socket and the other having a stem extending into said socket, a ball member rotatable and axially movable on said stem, and a resilient annulus disposed on said stem for constantly biasing said ball member into engagement with said socket, said annulus also preventing fluid leakage between said ball and said stem.

2. A universal joint assembly comprising a pair of connected universal joints, centering means for said joints comprising cooperating members one having a socket and the other having a stem extending into said socket, a sphere rotatable and axially slidable on said stem, and a resilient annulus attached to said other cooperating member and extending about said stem, said resilient annulus constantly biasing said sphere into engagement with said socket and also preventing fluid leakage between said sphere and said stem.

3. In a universal joint structure the combination of a pair of universal joint assemblies each comprising a yoke and a cross trunnioned therein, an intermediate torque transmitting member having oppositely extending yoke portions in which the crosses of said assemblies are also trunnioned, a positioning connection for said assemblies including a socket portion carried by the yoke of one of said assemblies and a ball portion carried by the yoke of the other of said assemblies and operating in the socket portion, said ball portion being rotatable and axially slidable relative to the yoke of said other assembly and having a substantially spherical outer surface, and a rubber-like member carried by said last mentioned yoke biasing said ball portion into engagement with said socket portion for ensuring uniform movement therebetween, said rubber-like member sealingly connecting said last mentioned yoke and said ball portion.

4. A universal joint assembly comprising a pair of connected universal joints, centering means for said joints comprising members having portions extending toward each other from the respective joints and provided at their adjacent ends with cooperating portions forming a swivel therebetween, one of said portions including means forming a socket, a stem on the other of said portions and extending into said socket, a ball member rotatable and slidable on said stem and rockably received in said socket, and a rubber-like member disposed about said stem and engaging said ball member to provide a slidable sealing connection therebetween, said rubber-like member biasing said ball member into engagement with said socket to ensure uniform sliding movement therebetween.

5. In a universal joint structure the combination comprising a pair of universal joint assemblies each having a yoke with a cross trunnion therein, intermediate torque transmitting member having oppositely extending yoke portions in which the crosses of said assemblies are also trunnioned, a centering assembly for said joint assemblies including a socket portion carried by the yoke of one of said joint assemblies and a stem on the other of said joint assemblies extending into said socket, a ball member rotatable and slidable on said stem and movably received in said socket, and a resilient rubber-like annulus disposed about said stem and engaging said ball member to provide a slidable sealing connection therebetween, said annulus biasing said ball member to constantly seat the same in said socket whereby uniform sliding movement is obtained between said ball member and said socket.

References Cited in the file of this patent

UNITED STATES PATENTS

| | | |
|---|---|---|
| 1,774,679 | Swenson | Sept. 2, 1930 |
| 1,979,768 | Pearce | Nov. 6, 1934 |
| 2,067,286 | Pearce | Jan. 12, 1937 |